United States Patent
Je

(10) Patent No.: US 10,277,674 B2
(45) Date of Patent: Apr. 30, 2019

(54) APPARATUS FOR RELAYING DATA TRANSMISSION IN SCADA SYSTEM

(71) Applicant: LSIS CO., LTD., Anyang-si, Gyeonggi-do (KR)

(72) Inventor: Jung-Kwang Je, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 162 days.

(21) Appl. No.: 15/393,961

(22) Filed: Dec. 29, 2016

(65) Prior Publication Data

US 2017/0295233 A1 Oct. 12, 2017

(30) Foreign Application Priority Data

Apr. 12, 2016 (KR) .......................... 10-2016-0044841

(51) Int. Cl.
*H04L 29/08* (2006.01)

(52) U.S. Cl.
CPC .......... *H04L 67/1095* (2013.01); *H04L 67/28* (2013.01); *H04L 67/2804* (2013.01)

(58) Field of Classification Search
CPC .. H04L 67/1095; H04L 67/28; H04L 67/2804
USPC ......................................................... 709/217
See application file for complete search history.

(56) References Cited

U.S. PATENT DOCUMENTS

| | | | |
|---|---|---|---|
| 2003/0235211 A1* | 12/2003 | Thiru ..................... | H04L 29/06 370/469 |
| 2008/0228908 A1 | 9/2008 | Link et al. | |
| 2009/0207042 A1* | 8/2009 | Park ....................... | G01D 18/00 340/870.02 |
| 2010/0049717 A1* | 2/2010 | Ryan ....................... | G05B 9/03 707/639 |
| 2010/0050017 A1* | 2/2010 | Almadi ................... | E21B 47/12 714/15 |
| 2010/0135788 A1 | 6/2010 | Qu | |

(Continued)

FOREIGN PATENT DOCUMENTS

| CA | 2734616 A1 | 2/2010 |
|---|---|---|
| KR | 10-2008-0021219 A | 3/2008 |

(Continued)

OTHER PUBLICATIONS

European Search Report dated Mar. 29, 2017 issued in connection withe counterpart European Application No. 16203831.9.

*Primary Examiner* — Joseph L Greene
(74) *Attorney, Agent, or Firm* — K&L Gates LLP

(57) ABSTRACT

Disclosed herein is an apparatus for relaying data transmission in a SCADA server. The apparatus includes: a communications unit configured to receive a data transmission request from the host server and transmit a target data request by the host server to the host server; a update unit configured to update event data corresponding to the target data among event data in the SCADA server and transmit the target data requested by the host server to the communications unit; and a synchronization management unit configured to synchronize the event data updated by the update unit with a backup SCADA server. Data transmission to a host server and control instruction reception from the host server in a SCADA system can be processed quickly and accurately.

7 Claims, 3 Drawing Sheets

(56) References Cited

U.S. PATENT DOCUMENTS

| | | | |
|---|---|---|---|
| 2014/0195844 A1* | 7/2014 | Laval | G06F 11/3062 713/340 |
| 2015/0128256 A1* | 5/2015 | Nakao | G06F 21/35 726/19 |
| 2015/0309497 A1 | 10/2015 | Calvin et al. | |

FOREIGN PATENT DOCUMENTS

| | | |
|---|---|---|
| KR | 10-2011-0042589 | 4/2011 |
| KR | 10-2011-0061191 A | 6/2011 |
| KR | 10-2015-0080080 A | 7/2015 |

* cited by examiner

APPARATUS FOR RELAYING DATA TRANSMISSION IN SCADA SYSTEM

CROSS REFERENCE TO RELATED APPLICATION

This application claims the benefit of Korean Patent Application No. 10-2016-0044841, filed on Apr. 12, 2016, entitled "APPARATUS FOR RELAYING DATA TRANSMISSION IN SCADA SYSTEM", which is hereby incorporated by reference in its entirety into this application.

BACKGROUND

1. Technical Field

The present disclosure relates to an apparatus for relaying data transmission in a SCADA server.

2. Description of the Related Art

A supervisory control and data acquisition (SCADA) system is a large-scale system that processes and monitors a large volume of data and provides a variety of functions associated therewith. A SCADA server monitors and processes a number of data items including data transmitted from remote terminals such as RTUs and a PLC, state data of the devices, and state data of the system. In order to appropriate operate a number of data items in the environment where the SCADA server is installed, it is necessary to optimize the system by engineering. However, a variety of errors may occur during the process of optimizing depending on the system environment and a user's capability. Accordingly, when an error occurs, it is necessary to easily determine the cause of the error and cope with it. FIG. 1 is a block diagram of an existing SCADA system.

Referring to FIG. 1, a SCADA system 10 includes a host server 102, a SCADA server 104, a front end processor (FEP) 106, remote terminal units (RTUs) 108, and remote installation devices 110.

The SCADA server 104 sends a request to connect to the FEP 106 by using network configuration information for conducting communications with the FEP 106. If the FEP 106 accepts the request, the connection between SCADA server 104 and the FEP 106 is established.

Once the connection is established, the SCADA server 104 sends a control instruction to the FEP 106. The FEP 106 delivers the control instruction to the RTUs 108. The RTUs 108 may control their respective remote installation devices 110 pursuant to the received control instruction.

The FEP 106 may receive data generated by the remote installation devices 110 from the RTUs 108 to deliver it to the SCADA server 104. The communications between the FEP 106 and the RTUs 108 may be carried out by using transmission control protocol (TCP) based on serial communications or Ethernet communications.

The SCADA server 104 may manage and control the RTUs 108 based on the data generated by the remote installation devices 110. In addition, the SCADA server 104 may receive a control instruction from the host server 102 at a higher level or may transmit data requested by the host server 102.

In the related art, however, to transmit data from the SCADA server 104 to the host server 102 or to transmit a control instruction from the host server 102 to the SCADA server 104, an additional relay is required, such as a gateway. Due to such additional relay, there is a problem in that data reception by the host 102 or the control instruction reception by the SCADA server 104 may be delayed. In addition, due to such additional relay, there is another problem in that it is not flexible to build a database and process data.

SUMMARY

It is an object of the present disclosure to provide an apparatus for relaying data transmission that is capable of quickly and accurately process data transmission to a host server and control instruction reception from the host server in a SCADA system.

It is another object of the present disclosure to provide an apparatus for relaying data transmission that is capable of improving data transmission and processing speed of a SCADA system and building a flexible database.

Objects of the present disclosure are not limited to the above-described objects and other objects and advantages can be appreciated by those skilled in the art from the following descriptions. Further, it will be easily appreciated that the objects and advantages of the present disclosure can be practiced by means recited in the appended claims and a combination thereof.

In accordance with one aspect of the present disclosure, an apparatus for relaying data transmission between a SCADA server and a host server includes: a communications unit configured to receive a data transmission request from the host server and transmit a target data request by the host server to the host server; a update unit configured to update event data corresponding to the target data among event data in the SCADA server and transmit the target data requested by the host server to the communications unit; and a synchronization management unit configured to synchronize the event data updated by the update unit with a backup SCADA server.

According to an exemplary embodiment of the present disclosure, data transmission to a host server and control instruction reception from the host server in a SCADA system can be processed quickly and accurately.

According to another exemplary embodiment of the present disclosure, data transmission and processing speed of a SCADA system can be improved and a flexible database can be built.

DETAILED DESCRIPTION

Figure 1:
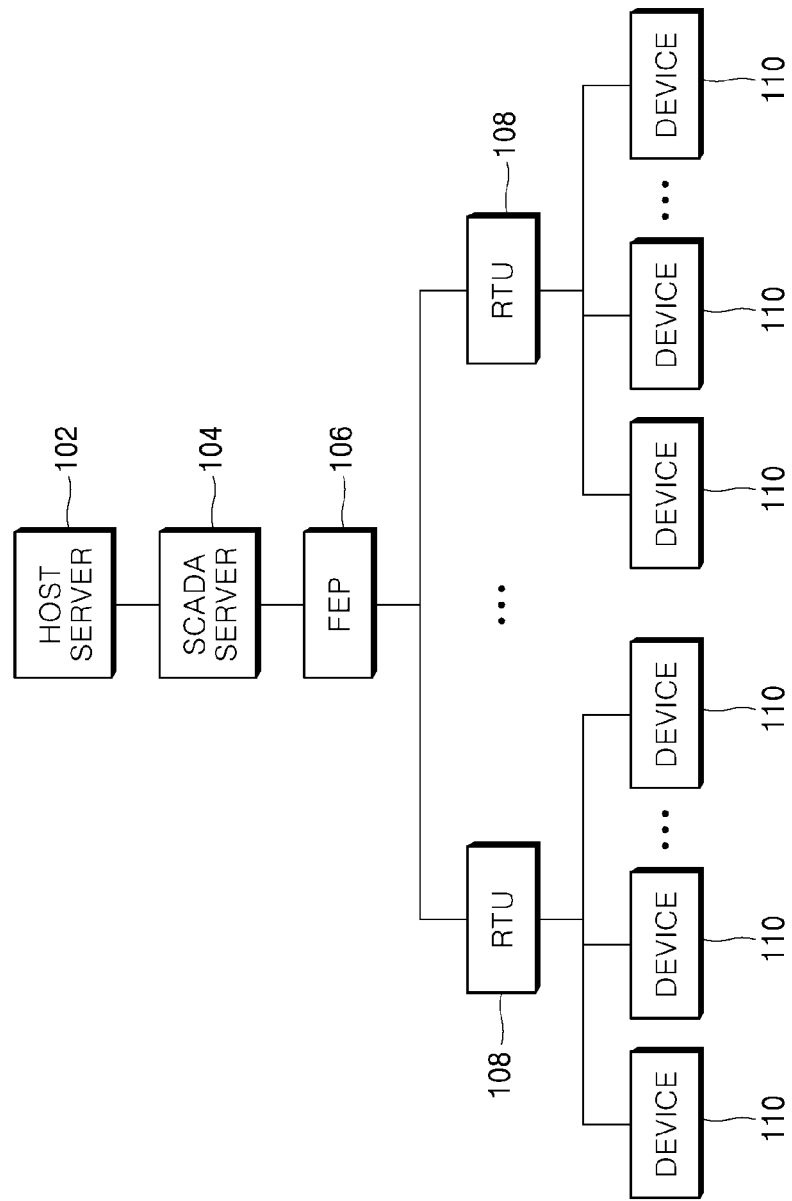
FIG. 1 is a block diagram of an existing SCADA system.

The above objects, features and advantages will become apparent from the detailed description with reference to the accompanying drawings. Embodiments are described in sufficient detail to enable those skilled in the art in the art to easily practice the technical idea of the present disclosure. Detailed descriptions of well known functions or configurations may be omitted in order not to unnecessarily obscure the gist of the present disclosure. Hereinafter, embodiments of the present disclosure will be described in detail with reference to the accompanying drawings. Throughout the drawings, like reference numerals refer to like elements.

Figure 2:
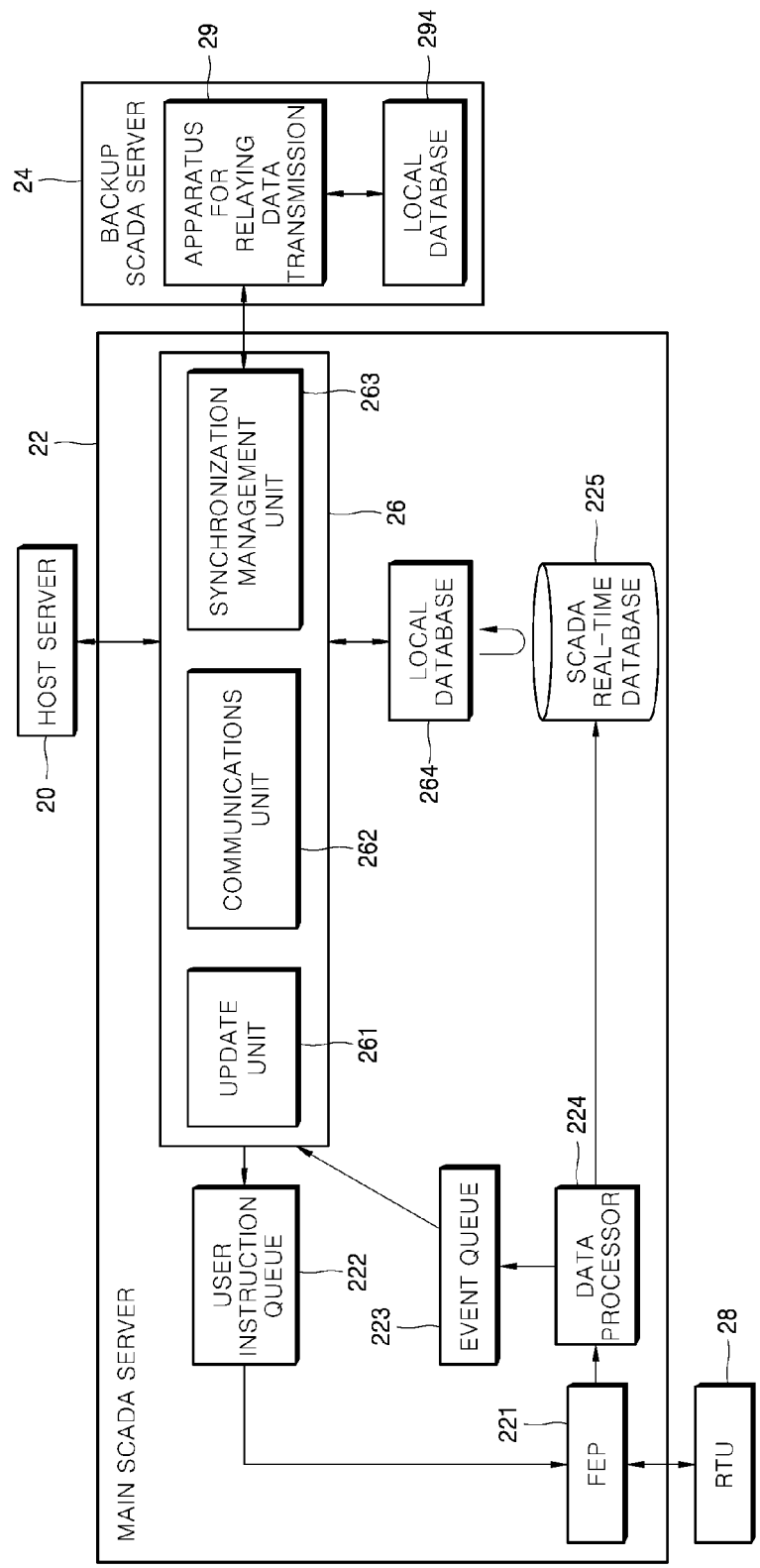
FIG. 2 is a block diagram of a SCADA system and an apparatus for relaying data transmission according to an exemplary embodiment of the present disclosure.

FIG. 2 is a block diagram of a SCADA system and an apparatus for relaying data transmission according to an exemplary embodiment of the present disclosure.

Referring to FIG. 2, the SCADA system according to the exemplary embodiment of the present disclosure includes a main SCADA server 22 and a backup SCADA server 24. The main SCADA server 22 acquires data from remote installation devices (not shown) and issues a control instruction to the remote installation devices. The backup SCADA server 24 has the same functionality as the main SCADA server 22, and backs up in real-time or periodically the data from the remote installation devices acquired by the main SCADA server 22 and other data generated by the main SCADA server 22. Accordingly, if there is a fault in the main SCADA server 22, the backup SCADA server 24 may perform the same functionality as the backup SCADA server 24. In this manner, according to the exemplary embodiment of the present disclosure, duplicated system is implemented for improving stability of the SCADA system. Further, in order to further enhance the stability, dual physical lines may be implemented between the main SCADA server 22 and the backup SCADA server 24.

Referring to FIG. 2, the main SCADA server 22 includes an apparatus 26 for relaying data transmission according to the exemplary embodiment of the present disclosure. Likewise, the backup SCADA server 24 may also include an apparatus for relaying data transmission 29 according to the exemplary embodiment of the present disclosure. Hereinafter, the exemplary embodiment of the present disclosure will be described with respect to the apparatus 26 included in the main SCADA server 22.

As used herein, event data may refer to data received by the main SCADA server 22 from the remote installation devices via the RTUs 28. As used herein, event data may also refer to data that is received via a FEP 221 and processed by the data processor 224. Such event data is stored in a SCADA real-time database 225 in real-time.

As used herein, target data refers to particular event data selected from among the event data acquired or generated by the main SCADA server 22. According to an exemplary embodiment of the present disclosure, a user may set as target data particular event data from among the event data acquired or generated by the main SCADA server 22 via an application provided from the main SCADA server 22 or an external terminal. In addition, according to an exemplary embodiment of the present disclosure, the host server 20 may set as target data particular event data selected from among the event data acquired or generated by the main SCADA server 22.

According to the exemplary embodiment of the present disclosure, the apparatus for relaying data transmission 26 receives a data transmission request from the host server 20 and acquires target data requested by the host server 20 from the main SCADA server 22 to transmit it to the host server 20. In addition, the apparatus for relaying data transmission 26 may receive a control instruction from the host server 20 and may transmit the received control instruction to the main SCADA server 22.

Referring to FIG. 2, the apparatus for relaying data transmission 26 may include an update unit 261, a communications unit 262 and a synchronization management unit 263.

The update unit 261 updates event data corresponding to target data among the event data of the main SCADA server 22. According to an exemplary embodiment of the present disclosure, the RTUs 28 deliver event data received from the respective remote installation devices to the FEP 221. The FEP 221 delivers the received event data to the data processor 224. The event data processed by the data processor 224 is stored in the SCADA real-time database 225. The update unit 261 loads event data corresponding to target data requested by the host server 20 from among the event data stored in the SCADA real-time database 225 and stores it in a local database 264 periodically.

According to an exemplary embodiment of the present disclosure, the update unit 261 may scan the SCADA real-time database 225 at predetermined intervals to acquire the event data corresponding to the target data requested by the host server 20. The intervals at which the update unit 216 scans may be predetermined by the user. The update unit 216 stores the periodically acquired event data in the local database 264. Accordingly, the local database 264 can be synchronized with the SCADA real-time database 225.

In addition, according to an exemplary embodiment of the present disclosure, the update unit 261 may receive the event data corresponding to the target data directly from the FEP 221. Further, according to another exemplary embodiment of the present disclosure, the event data received by the FEP 221 may be processed by the data processor 224 to then be stored in an event queue 223. The update unit 216 may store the event data stored in the event queue 223 in the local database 264 or may transmit it to the host server 20.

The communication unit 262 receives a data transmission request from the host server 20. In addition, the communications unit 262 transmits the target data requested by the host server 20 to the host server 20 in response to the request. Upon receiving the data transmission request from the host server 20, the communications unit 262 searches for the local database 264 to acquire the target data requested by the host server 20. In addition, the communications unit 262 may also acquire the target data requested by the host server 20 from the event queue 223.

In addition, the communications unit 262 may receive a control instruction transmitted from the host server 20 and may transmit the received control instruction to the main SCADA server 22. In addition, the communications unit 262 may receive a state check request from the host server 20 and may transmit the received request to the main SCADA server 22. The control instruction or the state check request received by the communications unit 262 may be transmitted to the FEP 221 via a user instruction queue 222.

Upon receiving the state check request from the host server 20, the main SCADA server 22 interrupts the transmission of the target data to the host server 20 and transmits the information on the operating state of the main SCADA server 22 to the host server 20. Then, the main SCADA server 22 is switched to a standby mode and remains in the mode until a data transmission request is transmitted from the host server 20.

The synchronization management unit 263 synchronizes the event data updated by the update unit 261 with the backup SCADA server 24. Specifically, the synchronization management unit 263 conducts the synchronization by transmitting the event data stored in the local database 264 to the apparatus for relaying data transmission 29 of the backup SCADA server 24 at predetermined intervals. The intervals at which the synchronization management unit 263 transmits the event data to the apparatus for relaying data transmission 29 of the backup SCADA server 24 may be set by the user. The apparatus for relaying data transmission 29 of the backup SCADA server 24 stores the event data transmitted by the synchronization management unit 263 in a local database 294.

According to an exemplary embodiment of the present disclosure, the target data transmitted to the host server 20 by the apparatus for relaying data transmission 26 may include acquisition time information indicative of the time when the target data is acquired by the main SCADA server 22. Such target data is referred to as sequence of event (SOE). If the target data includes the acquisition time information, the apparatus for relaying data transmission 26 may transmit the target data to the host server 20 at predetermined intervals even when there is no request from the host server 20.

As described above, the host server 20 may transmit the data transmission request or the state check request to the apparatus for relaying data transmission 26 of the main SCADA server 22 or the apparatus for relaying data transmission 29 of the backup SCADA server 24.

According to an exemplary embodiment of the present disclosure, when the communications unit 262 of the apparatus for relaying data transmission 26 receives the data transmission request, the main SCADA server 22 operates in an active mode. In addition, when the communications unit 262 of the apparatus for relaying data transmission 26 receives the state check request, the main SCADA server 22 operates in the standby mode. The target data is transmitted only when the main SCADA server 22 is in the active mode, not in the standby mode.

Accordingly, one of the main SCADA server 22 and the backup SCADA server 24 that receives the data transmission request from the host server 20 becomes an active mode server while the other that receives the state check request becomes a standby mode server. The host server 20 sets one of the two servers as the active mode server and the other as the standby mode server by transmitting the data transmission request and the state check request.

Figure 3:
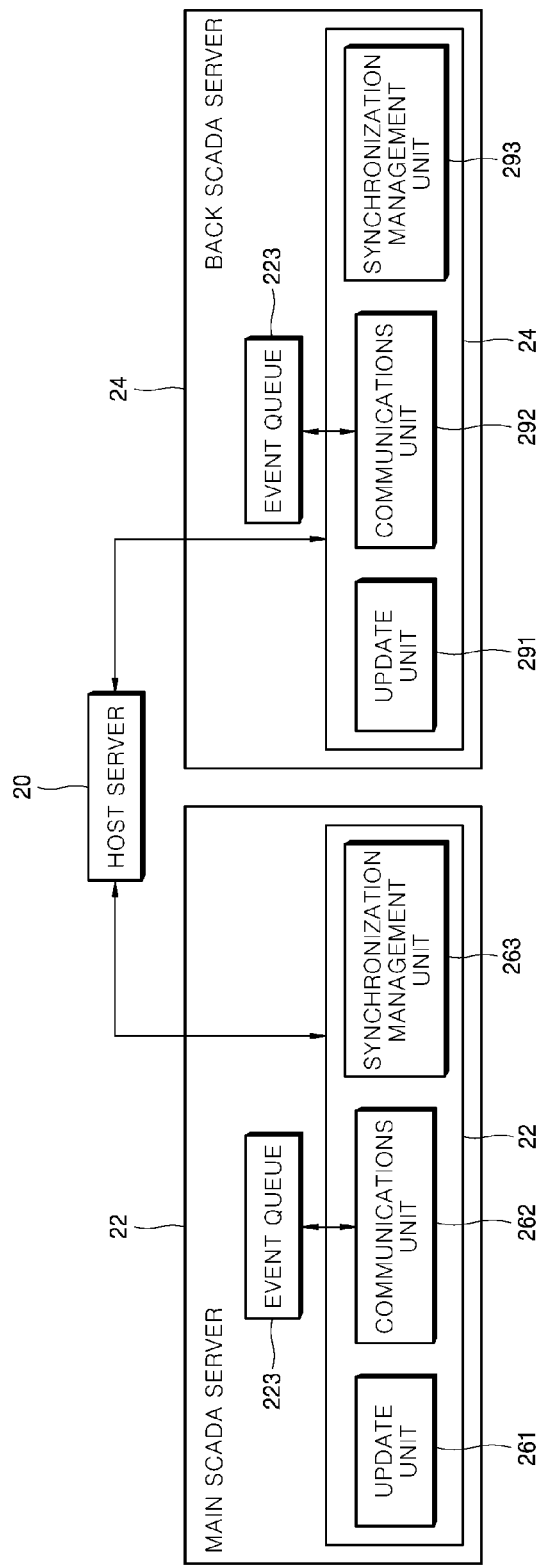
FIG. 3 is a diagram illustrating duplicated operation process of the SCADA system according to an exemplary embodiment of the present disclosure.

FIG. 3 is a diagram illustrating duplicated operation process of the SCADA system according to an exemplary embodiment of the present disclosure.

According to the exemplary embodiment shown in FIG. 3, the main SCADA server 22 first receives a data transmission request from the host server 20 to enter the active mode, and the backup SCADA server 24 receives a state check request from the host server 20 to enter the standby mode. The main SCADA server 22 transmits the target data requested by the host server 20 to the host server 20 in response to the request from the host server 20.

While receiving the target data from the active mode server, i.e., the main SCADA server 22, the host server 20 may transmit the data transmission request to the backup SCADA server 24 and transmit the state check request to the main SCADA server 22. Accordingly, the main SCADA server 22 may be switched over to the standby mode while the backup SCADA server 24 is switched over to the active mode.

However, if the main SCADA server 22 did not complete the transmission of the target data requested by the host server 20 yet, the communications unit 262 of the main SCADA server interrupts the transmission of the target data and transmits an unsolicited message to the host server 20, which notifies that the transmission of the data is not completed. The rest of the target data that is not transmitted yet is stored in the event queue at the time of transmitting the unsolicited message. According to another exemplary embodiment of the present disclosure, the rest of the target data may be stored in another storage, e.g., the local database.

Upon receiving the unsolicited message, the host server 20 may check the existence and the list of the rest of the target data that is not transmitted from the main SCADA server 22 yet. Accordingly, the host server 20 requests the transmission of the rest of the target data to the backup SCADA server 24.

As described above, the data in the main SCADA server 22 is synchronized with the data in the backup SCADA server 24 by the synchronization management unit 263, and thus the backup SCADA server 24 may check the list of the rest of the target data to transmit it to the host server 20. According to another exemplary embodiment of the present disclosure, the host server 20 may request the transmission of the rest of the target data to the main SCADA server 22.

When the rest of the target data has been received in this manner, the host server 20 transmits a confirm message to the main SCADA server 22. After the main SCADA server 22 has received the confirm message, the main SCADA server 22 checks if the host server 20 receives the rest of the target data, and deletes the rest of the target data stored in the event queue 223 or other storage.

Through the above-described processes, the host server 20 can receive the requested target data completely even if a mode switching between the active mode and the standby mode takes place during the process of transmitting the target data.

The present disclosure described above may be variously substituted, altered, and modified by those skilled in the art to which the present invention pertains without departing from the scope and sprit of the present disclosure. Therefore, the present disclosure is not limited to the above-mentioned exemplary embodiments and the accompanying drawings.

What is claimed is:

1. An apparatus for relaying data transmission between a SCADA server and a host server, the apparatus comprising:
    a communications unit configured to receive a data transmission request from the host server and to acquire, from the SCADA server, target data requested by the host server to transmit the target data to the host server;
    an update unit configured to update event data corresponding to the target data among event data in the SCADA server and transmit the target data requested by the host server to the communications unit; and
    a synchronization management unit configured to synchronize the event data updated by the update unit with a backup SCADA server,
    wherein the apparatus is included in the SCADA server, and
    wherein the SCADA server operates in an active mode if the communications unit receives the data transmission request from the host server, and the SCADA server operates in a standby mode if the communications unit receives a state check request from the host server.

2. The apparatus of claim 1, wherein the communications unit delivers a control instruction transmitted from the host server to the SCADA server.

3. The apparatus of claim 1, wherein the update unit scans a real-time database of the SCADA server at predetermined intervals to acquire the event data corresponding to the target data, and stores the acquired event data in a local database.

4. The apparatus of claim 1, wherein when the SCADA server is switched over to the standby mode while the target data is transmitted to the host server, the communications unit transmits an unsolicited message to the host server and interrupts the transmission of the target data.

5. The apparatus of claim 1, wherein after the SCADA server is switched over to the standby mode, the rest of the target data that is not transmitted to the host server is stored in a data queue, and wherein the rest of the target data stored in the data queue is deleted when the communications unit receives a confirm message from the host server.

6. The apparatus of claim 1, wherein the target data comprises acquisition time information indicative of a time at which the target data is acquired by the SCADA server.

7. The apparatus of claim 1, wherein the target data is event data among the event data of the SCADA server that is designated by the host server or a user.

* * * * *